(12) United States Patent
Lin et al.

(10) Patent No.: US 6,735,058 B2
(45) Date of Patent: May 11, 2004

(54) CURRENT-PERPENDICULAR-TO-PLANE READ HEAD WITH AN AMORPHOUS MAGNETIC BOTTOM SHIELD LAYER AND AN AMORPHOUS NONMAGNETIC BOTTOM LEAD LAYER

(75) Inventors: Tsann Lin, Saratoga, CA (US); Daniele Mauri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/067,645

(22) Filed: Feb. 4, 2002

(65) Prior Publication Data

US 2003/0206379 A1 Nov. 6, 2003

(51) Int. Cl.[7] .................................................. G11B 5/39
(52) U.S. Cl. ........................................ 360/319; 360/322
(58) Field of Search ................................ 360/319, 322, 360/324, 324.1, 324.11, 324.12, 324.2

(56) References Cited

U.S. PATENT DOCUMENTS

| 5,738,946 A | 4/1998 | Iwasaki et al. .............. 428/611 |
| 5,849,422 A | 12/1998 | Hayashi ....................... 428/611 |
| 5,872,502 A | 2/1999 | Fugikata et al. ........... 338/32 R |
| 5,946,167 A * | 8/1999 | Hara et al. .................. 360/322 |
| 5,958,611 A | 9/1999 | Ohta et al. .................. 428/692 |
| 5,986,858 A | 11/1999 | Sato et al. |
| 6,061,211 A * | 5/2000 | Yoda et al. ............. 360/324.12 |
| 6,157,526 A * | 12/2000 | Watanabe et al. ...... 360/324.12 |
| 6,292,334 B1 * | 9/2001 | Koike et al. ................. 360/319 |
| 6,327,107 B1 * | 12/2001 | Komuro et al. ............... 360/55 |
| 6,500,570 B2 * | 12/2002 | Hasegawa et al. .......... 428/692 |
| 6,515,837 B1 * | 2/2003 | Hamakawa et al. ......... 360/319 |

FOREIGN PATENT DOCUMENTS

| JP | 1-143311 | 6/1989 |
| JP | 9-81912 | 3/1997 |
| JP | 9-91625 | 4/1997 |
| JP | 10-154619 | 6/1998 |
| JP | 10-261824 | 9/1998 |
| JP | 10-289417 | 10/1998 |
| JP | 10-303477 | 11/1998 |
| JP | 2000011333 | 1/2000 |

* cited by examiner

Primary Examiner—David Ometz
(74) Attorney, Agent, or Firm—Kunzler & Associates

(57) ABSTRACT

A current-perpendicular-to-plane (CPP) read head with an amorphous magnetic bottom shield layer and an amorphous nonmagnetic bottom lead gap layer is disclosed. The amorphous magnetic bottom shield layer and amorphous nonmagnetic bottom lead layer provide a planar surface for the CPP read head deposited thereon to exhibit a low ferromagnetic coupling field and a high giant (or tunneling) magnetoresistance coefficient. The amorphous magnetic bottom shield layer is preferably formed of an Fe-based or Co-based film. The amorphous nonmagnetic bottom lead layer is preferable formed of a W-based or Ni-based film.

22 Claims, 7 Drawing Sheets

CURRENT-PERPENDICULAR-TO-PLANE READ HEAD WITH AN AMORPHOUS MAGNETIC BOTTOM SHIELD LAYER AND AN AMORPHOUS NONMAGNETIC BOTTOM LEAD LAYER

BACKGROUND OF THE INVENTION

1. The Field of the Invention

The present invention relates generally to a current-perpendicular-to-plane (CPP) read head for magnetic recording and, in particular, to a CPP read head with an amorphous magnetic bottom shield layer and an amorphous nonmagnetic bottom lead layer.

2. The Relevant Art

Computer systems generally utilize auxiliary memory storage devices having magnetic read/write heads and a magnetic medium. Data can be written on the magnetic medium by the magnetic write head and can be read from the magnetic medium by the magnetic read head. A direct access storage device, such as a disk drive, incorporating rotating magnetic disks is commonly used for data in magnetic media on the disk surfaces. Data are written on concentric, radially spaced tracks on the magnetic media, and are read from the tracks on the magnetic media.

In high capacity disk drives, a current-in-plane (CIP) read head, in which a sense current flows in a direction parallel to film interfaces, is now extensively used to read data from the tracks on the magnetic media. This CIP read head comprises a giant magnetoresistance (GMR) sensor, a longitudinal bias (LB) stack, and conductor leads. The GMR sensor typically comprises two ferromagnetic films separated by an electrically conducting nonmagnetic film. The resistance of this GMR sensor varies as a function of the spin-dependent transmission of conduction electrons between the two ferromagnetic films and the accompanying spin-dependent scattering which takes place at interfaces of the ferromagnetic and nonmagnetic films.

In the conventional GMR sensor, one of the ferromagnetic films, referred to as a transverse pinned (or reference) layer, typically has its magnetization pinned by exchange coupling with an antiferromagnetic film, referred to as a transverse pinning layer. The magnetization of the other ferromagnetic film, referred to as a free (or sense) layer is not fixed, however, and is free to rotate in response to signal fields from the magnetic medium. In this GMR sensor, a GMR effect varies as the cosine of the angle between the magnetization of the reference layer and the magnetization of the sensing layer. Data can be read from the magnetic medium because the external magnetic field from the magnetic medium rotates the magnetization of the sense layer, which in turn changes the resistance of the GMR sensor and correspondingly changes a readout voltage.

FIG. 1 shows a typical prior art CIP read head 100. A GMR sensor portion 101 is fabricated in a central region 102, while LB (longitudinal bias) stacks and conductor lead layers 126 are fabricated in two end regions 103 and 105. Various films of the GMR sensor are deposited on a bottom gap layer 118, which is previously deposited on a bottom shield layer 120. The bottom shield layer 120 is deposited on a wafer.

Photolithographic patterning and ion milling are applied to define the central region 102 and the two end regions 103 and 105. In the GMR sensor 101, a ferromagnetic sense layer 106 is separated from a ferromagnetic reference layer 108 by an electrically conducting nonmagnetic spacer layer 110. The magnetization of the reference layer 108 is fixed through exchange coupling with an antiferromagnetic transverse pinning layer 114. The depicted GMR sensor 101 also comprises seed layers 116 and cap layers 112. The seed layers 116 facilitate the growth of the transverse pinning, reference, spacer and sense layers with preferred crystalline textures during depositions so that desired improved GMR properties are attained. The cap layer 112 protects the underlying films from oxidation during subsequent annealing operations.

The LB stacks and conducting lead layers 126 are deposited in the end regions 103 and 105. The films deposited in the central and end regions are sandwiched between electrically insulating nonmagnetic films, one referred to as a bottom lead layer 118 and the other referred to as a top lead layer 124.

To ensure proper sensor operation, exchange coupling between the transverse pinning layer 114 and the reference layer 108 must be sufficiently high to rigidly pin the magnetization of the reference layer 108 in a transverse direction perpendicular to the air bearing surface (the surface being viewed in FIG. 1). An inadequate exchange coupling may cause canting of the magnetization of the reference layer from the preferred transverse direction, thus causing malfunction of the GMR sensor. This ferromagnetic/antiferromagnetic exchange coupling is typically characterized by a unidirectional anisotropy field ($H_{UA}$) induced by this exchange coupling. This $H_{UA}$ field thus must be sufficiently high to rigidly pin the magnetization of the reference layer for proper sensor operation.

To ensure optimal biasing of GMR responses, another exchange coupling between the ferromagnetic reference layer and the ferromagnetic sense layers must be optimized in order to orient the magnetization of the sense layer in a longitudinal direction parallel to the air bearing surface. The ferromagnetic/ferromagnetic exchange coupling is typically characterized by a ferromagnetic field ($H_F$) induced by the exchange coupling. The $H_F$ field thus must be very well controlled in order to balance two other fields in the sense layer, a demagnetizing field induced by the magnetization of the reference layer, and a current-induced field. A non-optimal or high $H_F$ may cause the magnetization of the sense layer to deviate from the preferred longitudinal direction, thus leading to non-linear, low GMR responses.

The disk drive industry has been engaged in an on-going effort to fabricate a narrower GMR sensor for increasing disk drive track density, and to sandwich the CIP read head into thinner gap layers for increasing linear density. It is crucial for the narrower GMR sensor to exhibit a higher GMR coefficient, and for the thinner gap layer to prevent current shorting between the CIP read head and shield layers. The GMR coefficient of the GMR sensor is expressed as $\Delta R_G/R_{//}$, where $R_{//}$ is a resistance measured when the magnetizations of the sense and reference layers are parallel to each other, and $\Delta R_G$ is the maximum giant magnetoresistance (GMR) measured when the magnetizations of the sense layer 106 and the reference layer 108 are antiparallel to each other. A higher GMR coefficients leads to higher signal sensitivity.

A new challenge will be posed when increasingly narrow GMR sensors cannot be made to exhibit higher GMR coefficients for further increasing the track density, and when increasingly thinner gap layers cannot be made to prevent current shorting between the CIP read head and shield layers. To solve these issues, a current-perpendicularto-plane (CPP) read head, which also comprises layers of deposited films but in which the sense current flows in a direction perpendicular to the film interfaces, has been developed.

CPP read heads typically also comprise a GMR sensor, a LB stack, and conductor leads, but all these films are confined in the central region only. The conducting spacer layer separating the reference and sensing layers is, in the CPP read head, used as a conducting barrier layer across which the sense current flows. Typically, the GMR sensor of the CPP read head exhibits a GMR coefficient that is about 40% higher than a similar GMR sensor of the CIP read head. In addition, the GMR sensor can be replaced by a tunneling magnetoresistance (TMR) sensor by replacing the conducting barrier layer with an insulating barrier layer. Typically, the TMR sensor exhibits a tunneling magnetoresistance (TMR) coefficient higher than the GMR sensor of the CPP read head. The TMR coefficient of the TMR sensor is expressed as $\Delta R_T/R_{//}$, where $R_{//}$ is a resistance measured when the magnetizations of the sense and reference layers are parallel to each other, and $\Delta R_T$ is the maximum tunneling magnetoresistance (TMR) measured when the magnetizations of the sense and reference layers are antiparallel to each other. A higher TMR coefficients leads to higher signal sensitivity.

FIG. 2 shows a typical prior art CPP read head 200. Bottom leads 218, the GMR (or TMR) sensor 201, the LB stack 225, and top leads 228 are all fabricated in a central region 202, while only insulating gap layers are formed in two end regions 203 and 205. Various films of the bottom leads 218, the GMR (or TMR) sensor 201, the LB stack 225, and the top leads 228 are all deposited on a bottom shield layer 220 which is, in turn, deposited on a wafer (not shown). Photolithographic patterning and ion milling are applied to define the central region 202 and the two end regions 203 and 205. In the GMR (or TMR) sensor 201, a ferromagnetic sense layer 206 is separated from a ferromagnetic reference layer 208 by an electrically conducting (or insulating) nonmagnetic spacer layer 210.

The magnetization of the reference layer 208 is fixed through exchange coupling with an antiferromagnetic transverse pinning layer 214. The depicted GMR sensor 200 (and the similarly configured TMR sensor) also comprises a seed layer 216 and a decoupling layer 212. On the other hand, the LB stack 225 comprises a longitudinal pinned layer 224, a longitudinal pinning layer 220 and a cap layer 226.

Because the sense current flows from bottom shield layer 220, through the CPP read head 201, to the top shield layer 230, or vice versa, electrical shorting between the bottom shield layer 220 and the CPP read head 201, and between the CPP read head 201 and the top shield layer 230, is no longer a concern. As a result, the read gap thickness can be further decreased and consequently, the linear density can be further increased.

Issues are encountered when attempting to use the CPP read head to increase both the track and linear densities. The bottom shield layer is typically formed of a ~1.75 μm thick Fe—Si—Al or Ni—Fe polycrystalline film, while the bottom lead is typically made of a ~30 nm thick Ta films. Their microstructures and rough topographies (mainly resulting from grain boundary grooves) may substantially affect the microstructures and flatness on the GMR or TMR sensor. These microstructural effects may lead to difficulties for the transverse pinning and reference layers to develop desired microstructures after annealing for attaining a high unidirectional anisotropy field ($H_{UA}$). The rough topographies may lead to difficulties in achieving a barrier layer, formed of a ~2 nm thick Cu—O conducting film in the GMR sensor (or formed of a ~0.6 nm thick Al—O insulating film in the TMR sensor), with a desired flatness and a consequent low ferromagnetic coupling field ($H_F$) and high GMR (or TMR) coefficient.

In the fabrication process of the prior art CPP read head, chemical mechanical polishing (CMP) is often applied to the bottom shield layer. Even after conducting a fine CMP process, the bottom shield layer still inevitably exhibits a rough topography due to an inherent polycrystalline nature. In the bottom shield layer, formed of a polycrystalline film, many grains with different crystalline orientations exist and may form grain boundaries with grooves due to different orientations. The existence of these grooves lead to the inherent rough topography.

From the above discussion, it can be seen that it would be a beneficial addition to the art to attain a controllable low $H_F$ and a high GMR (TMR) coefficient in a CPP read head by providing a bottom shield layer and a bottom lead with smooth topographies, on which the films of the GMR (or TMR) sensor can grow without unwanted microstructural effects.

OBJECTS AND BRIEF SUMMARY OF THE INVENTION

The apparatus of the present invention has been developed in response to the present state of the art, and in particular, in response to the problems and needs in the art that have not yet been fully solved by a currently available CPP read head. Accordingly, it is an overall object of the present invention to provide an improved CPP read head that overcomes many or all of the above-discussed shortcomings in the art.

To achieve the foregoing object, and in accordance with the invention as embodied and broadly described herein in the preferred embodiments, an improved CPP read head is provided. The CPP read head preferably comprises a bottom shield layer formed of an amorphous magnetic material, together with a bottom lead layer formed of an amorphous nonmagnetic material disposed to one side of the bottom shield layer. The CPP read head also preferably comprises a transverses pinning layer disposed to one side of the bottom lead layer, a keeper layer disposed to one side of the transverse pinning layer, a reference layer disposed to one side of the keeper layer, and a sensing layer disposed to one side of the reference layer.

In preferred embodiments, the CPP read head also comprises an antiparallel-coupling (APC) layer formed of a nonmagnetic conducting film disposed to one side of the keeper layer and a barrier layer formed on a nonmagnetic film disposed to one side of the referenced layer.

Also included may be a decoupling layer formed of a nonmagnetic film disposed to one side of the sensing layer, a longitudinal pinned layer formed of a ferromagnetic film disposed to one side of the decoupling layer, and a longitudinal pinning layer formed of an anti ferromagnetic (AFM) film disposed to one side of the longitudinal pinning layer. A cap layer may also be formed of a nonmagnetic film and disposed to one side of the longitudinal pinning layer.

Preferably the shield layer is formed on a substrate from an Fe—Al—Si or Ni—Fe film.

The CPP read head of the present invention in one embodiment may also comprise a second shield layer formed of an amorphous film deposited on the shield layer.

The CPP read head of the present invention in this embodiment also preferably comprises a bottom lead formed of an amorphous film deposited on the second shield layer formed of the amorphous film. In an alternative embodiment, a reference layer may be formed of an amorphous film deposited on the transverse pinning layer.

The CPP read head of the present invention in a further alternative embodiment comprises a polycrystalline reference layer within which in-situ oxidation is applied for the formation an intermediate amorphous phase.

A fabrication method of the present invention is also presented for forming amorphous films used as the second shield layer, the bottom lead, and the reference layer.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

A method of fabricating the CPP read sensor with the amorphous magnetic bottom shield layer and the amorphous nonmagnetic bottom lead layer, as described above, is also part of the present invention. FIGS. 5A,B illustrates one embodiment of the method 500 of forming the CPP read sensor with the amorphous magnetic bottom shield layer and the amorphous nonmagnetic bottom lead layer, in accordance with the present invention. The discussion of FIGS. 5A,B will be given with reference to FIGS. 3 and 4, but is not to be considered limited thereto.

DETAILED DESCRIPTION OF THE PREFERRED EMBODIMENTS

While the exact type of the CPP read head sensor is not to be limited, a CPP read head comprising a TMR sensor is given herein by way of example. Of course, the fabrication of other types of CPP read head sensors, including a GMR sensor, will be readily apparent from the present discussion.

Figure 3:
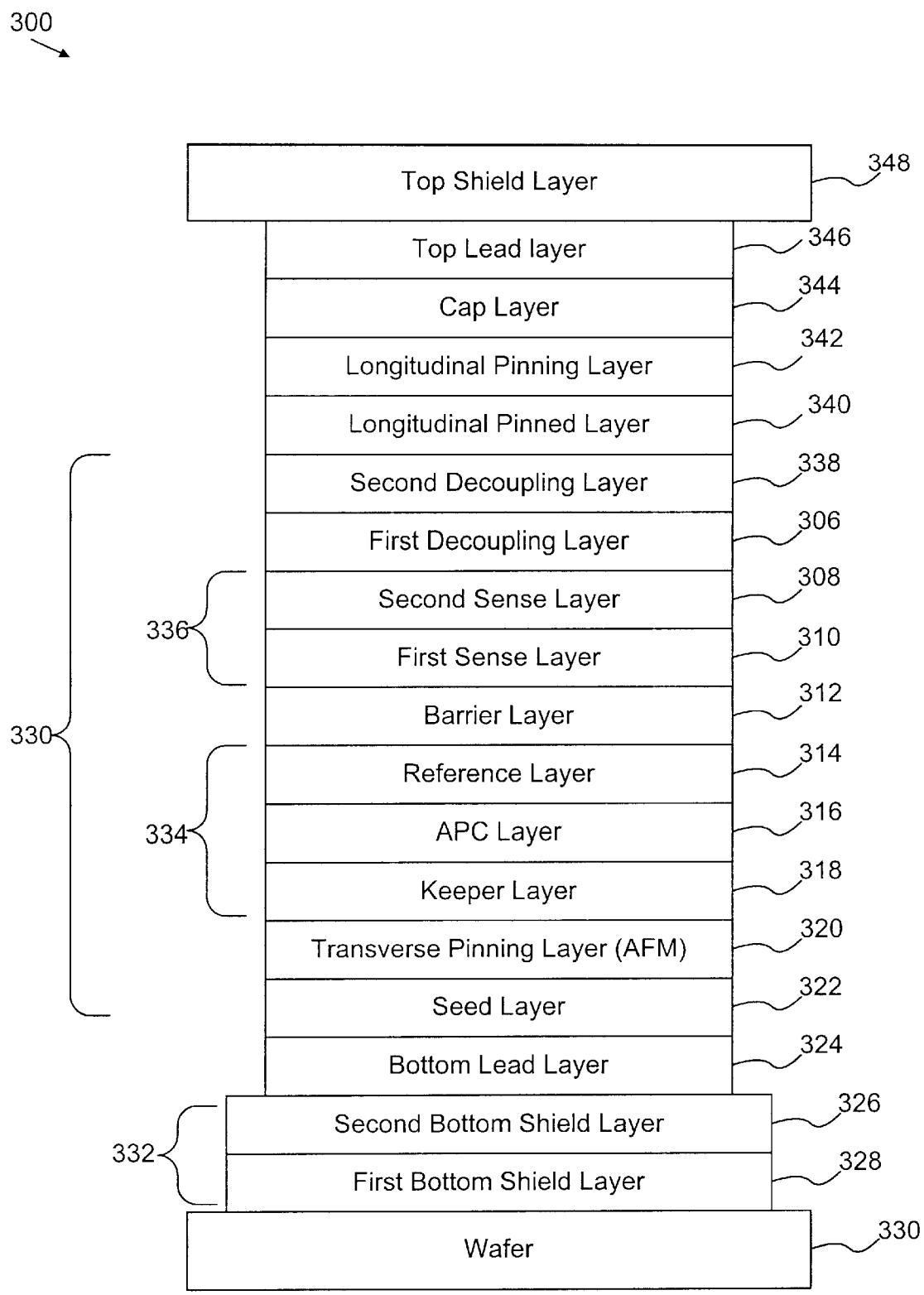
FIG. 3 is a cross-sectional view illustrating the structure of a CPP read head of the present invention.

FIG. 3 shows one embodiment of a CPP read head 300 of the present invention. The CPP Read head 300 is formed on a wafer 308. Atone extreme end of the CPP read head 300 is a bottom shield layer 332. The bottom shield layer 332 in one embodiment is formed of a first bottom shield layer 328 and a second bottom shield layer 326. The second bottom shield layer 326 (or in some embodiments, the entire bottom shield layer 332) is preferably formed as an amorphous magnetic film. An adjoining bottom lead layer 324 is preferably formed as an amorphous nonmagnetic film. The active layers of the CPP read head 300 are preferably deposited on the bottom shield layer. The first bottom shield layer 328 is preferably formed of an Fe—Si—Al film deposited on a wafer 330 with a preferred thickness in a range of between about 1 $\mu$m and about 2 $\mu$m, and has a most preferred thickness of about 1.85 $\mu$m.

The second bottom shield layer 326 is preferably formed of an amorphous Fe-based film (e.g., Fe—Si—Al—B, Fe—Zr—Nb, Fe—Zr—Re, Fe—Hf—Nb, Fe—Hf—Re, Fe—Y—Nb, Fe—Y—Re, etc.) or a Co-based film (e.g. Co—Zr—Nb, Co—Zr—Re, Co—Hf—Nb, Co—Hf—Re, Co—Y—Nb, Co—Y—Re, etc.). The second bottom shield layer 326 is preferably employed to exchange-couple to the underlying first bottom shield layer 328, and to planarize the polycrystalline surface of the first bottom shield layer 328. The second bottom shield layer 326 is preferably formed with a thickness in a range of between about 100 Å and about 500 Å, and has a most preferred thickness of about 300 Å.

The bottom lead layer 324 is preferably deposited on the second bottom shield layer 326. In one embodiment, the bottom lead layer 324 is formed of an amorphous nonmagnetic W-based film (e.g., W—N, W—Re, etc.) or Ni-based film (e.g. Ni—P, Ni—W). Under the present invention, the bottom lead layer 324 is preferably configured to prevent exchange-coupling between the bottom shield layer 332 and the TMR sensor 330, and to provide a flat surface on which to form the active layers of the TMR sensor, which helps provide a controllable low ferromagnetic coupling field ($H_F$) and a high TMR coefficient. The bottom lead layer 324 has a preferred thickness in a range of between about 100 Å and about 300 Å, and has a most preferred thickness of about 200 Å.

A seed layer 322 is preferably deposited on the bottom lead layer 324. The primary function of the seed layer 322 is to form a new foundation on the flat surface of the amorphous films for the growth of the TMR sensor. The seed layer 322 is preferably formed of a Ni—Fe film exhibiting a face-centered-cubic (FCC) structure with a {111} plane parallel to the flat surface of the amorphous films. The seed layer 322 has preferred thickness in a range of about 10 Å and about 30 Å, and has a most preferred thickness of about 10 Å.

A transverse pinning layer 320 is deposited on the seed layer 322. The transverse pinning layer 320 is preferably formed of an antiferromagnetic Mn-based (e.g., Ir—Mn, Pt—Mn or Ni—Mn, etc.,) film. The transverse pinning layer 320 when formed of an Ir—Mn film has a preferred thickness in a range of between about 60 Å and about 120 Å, and has a most preferred thickness of about 90 Å. The transverse pinning layer 320 when formed of an Pt—Mn film has a preferred thickness in a range of between about 100 Å and about 300 Å, and has a most preferred thickness of about 200 Å. The transverse pinning layer 320 when formed of an Ni—Mn film has a preferred thickness in a range of between about 200 Å and about 300 Å, and has a most preferred thickness of about 250 Å.

In one embodiment, the reference layer 314 is deposited directly on the transverse pinning layer 320. In an alternative preferred embodiment, two additional layers, one a keeper layer 318 and the other an antiparallel-coupling (APC) layer 316, are sandwiched between the transverse pinning layer 320 and the reference layer 314. Antiparallel coupling occurs across the APC layer, resulting in small net magnetizations. Due to these small net magnetizations, the unidirectional anisotropy field ($H_{UA}$) is substantially increased while the demagnetizing field induced in the sense layer is substantially decreased.

The keeper and reference layers are preferably formed of Co—Fe films, while the APC layer is preferably formed of a Ru film. The keeper layer 318 has a preferred thickness in a range of between about 9 Å and about 21 Å, and has a most preferred thickness of about 15 Å. The reference layer 314 has a preferred thickness in a range of between about 12 Å and about 24 Å, and has a most preferred thickness of about 18 Å. The APC layer 316 has a preferred thickness in a range of between about 6 Å and about 10 Å, and has a most preferred thickness of about 8 Å.

The thickness of the keeper layer 318 and the reference layer 314 are preferably adjusted simultaneously, as the performance of the TMR sensor 330 depends upon the difference between them. That is, the thickness of the keeper layer 318 subtracted from the thickness of the reference layer 314 is preferably kept within the range of between about 3 Å and about 6 Å.

Ideally, to attain surface flatness and ultimately a high ferromagnetic coupling field ($H_F$) and a high TMR coefficient, all of the films underlying the barrier layer 312 should be amorphous. Nevertheless, in reality, the transverse pinning layer 320 when made of the Pt—Mn film cannot be amorphous, because it has a face-center-tetragonal polycrystalline structure that is crucial for the needed antiferromagnetism. The APC layer 316 when made of the Ru film also cannot be amorphous, because it has a face-center-cubic polycrystalline structure that is crucial for the needed antiparallel coupling. On the other hand, both the keeper layer 316 and the reference layer 314 can be formed of amorphous Co—Fe—B films, or in-situ oxidation can be applied to the reference layer 314 to form a thin amorphous oxide layer within the reference layer 314. These approaches, however, have been found to decrease the unidirectional anisotropy field ($H_{UA}$).

Referring still to FIG. 3, a barrier layer 312 is shown deposited on the reference layer 314. The barrier layer 312 is preferably formed of an in-situ oxidized Al (Al—O) film. The barrier layer 312 has a preferred thickness in a range of between about 4 Å and about 6 Å, and has a most preferred thickness of about 5.4 Å.

A sensing layer 336 is deposited on the barrier layer 312. The sensing layer 336 preferably comprise a first sense layer 310 formed of a ferromagnetic Co—Fe film and a second sense layer 308 formed of a ferromagnetic Ni—Fe film. The Co—Fe film preferably has a thickness in the range of between about 6 Å and about 12 Å, and most preferably has a thickness of about 9 Å. The Ni—Fe film is preferably of a thickness in a range of between about 6 Å and about 30 Å, and most preferably has a thickness of about 15 Å.

One or more decoupling layers are preferably deposited on the second sense layer 308. The decoupling layers preferably comprise a first decoupling layer 306 formed of a Cu film and a second decoupling layer 338 formed of a Ru film. The Cu and Ru films are used together to diminish exchange coupling between the sense layers 336 and the longitudinal pinned layer 340 deposited on the Ru film. The combined use of the Cu and Ru films is considered to be more effective than the use of either film only in diminishing the exchange coupling.

As a result, the combined decoupling layers can be as thin as 30 Å or below to ensure strong magnetostatic interaction through a flux closure formed by the sense layers 336 and the longitudinal pinned layer 340, thereby achieving desirable sensor stability. The Cu film is also used to ensure desirable soft magnetic properties of the sense layers 336, and to reduce the ferromagnetic coupling field. The Cu film has a preferred thickness in a range of between about 5 Å and about 15 Å, and has a most preferred thickness of about 10 Å. The Ru film is also used to facilitate the longitudinal pinned layer 340 and the longitudinal pinning layer 342 deposited thereon to develop strong exchange coupling. The Ru film has a preferred thickness in a range of between about 10 Å and about 30 Å, and has a most preferred thickness of about 20 Å.

The longitudinal pinned layer 340 is shown deposited on the second decoupling layer 338. The longitudinal pinned layer 340 is preferably formed of a Co—Fe film. The longitudinal pinned layer 340 has a preferred thickness in a range of between about 9 and about 54 Å, and has a most preferred thickness of about 27 Å. The magnetic moment of the longitudinal pinned layer 340 is preferably 1.5 times of that of the sense layers 336 in order to achieve sensor stability.

A longitudinal pinning layer 342 is shown deposited on the longitudinal pinned layer 340 and is preferably formed of an Ir—Mn film. The longitudinal pinning layer 342 has a preferred thickness in a range of between about 45 Å and about 90 Å, and has a most preferred thickness of about 60 Å.

A cap layer 344 is deposited on the longitudinal pinning layer 342. The cap layer 344 is preferably formed of a Ru film. The cap layer 344 has a preferred thickness in a range of between about 30 Å and about 90 Å, and has a most preferred thickness of about 60 Å.

A top lead layer 346 is deposited on the cap layer 344. The top lead layer 346 is preferably formed of a Ta film. The top lead layer 346 has a preferred thickness in a range of between about 100 Å and about 300 Å, and has a most preferred thickness of about 200 Å.

Figure 4:
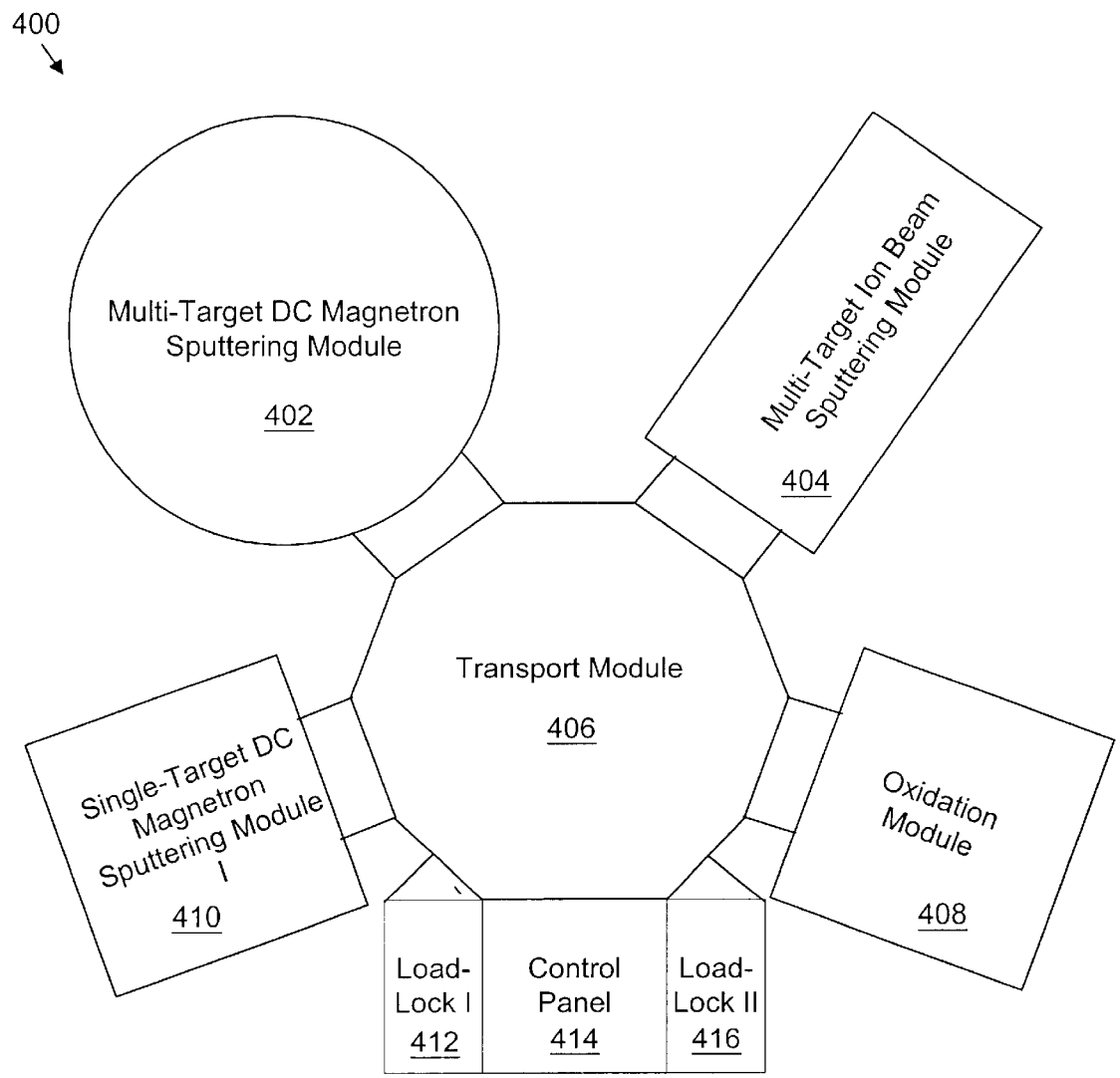
FIG. 4 is a schematic block diagram illustrating an integrated DC magnetic/ion beam sputtering system suitable for use in forming the CPP read head of the present invention.

FIG. 4 shows an integrated DC magnetron/ion beam sputtering system 400 suitable for fabricating the CPP read head with the amorphous magnetic bottom shield layer and the amorphous nonmagnetic bottom lead layer. The sputtering system 400 of FIG. 4 is sold by the Veeco Corporation of Plainview, N.Y. The sputtering system 400 as depicted comprises a transport module 406 surrounded by a first single-target DC magnetron sputtering module 410, a multi-target DC magnetron sputtering module 402, a multi-target ion beam sputtering module 404, and a second single-target DC magnetron sputtering module 408. Loadlocks 412, 416 allow the ingress and egress of wafers. A control panel 414 controls the parameters and processes of the sputtering system 400. Wafers are transferred within the system 400 without exposure to ambient air.

Figure 5:
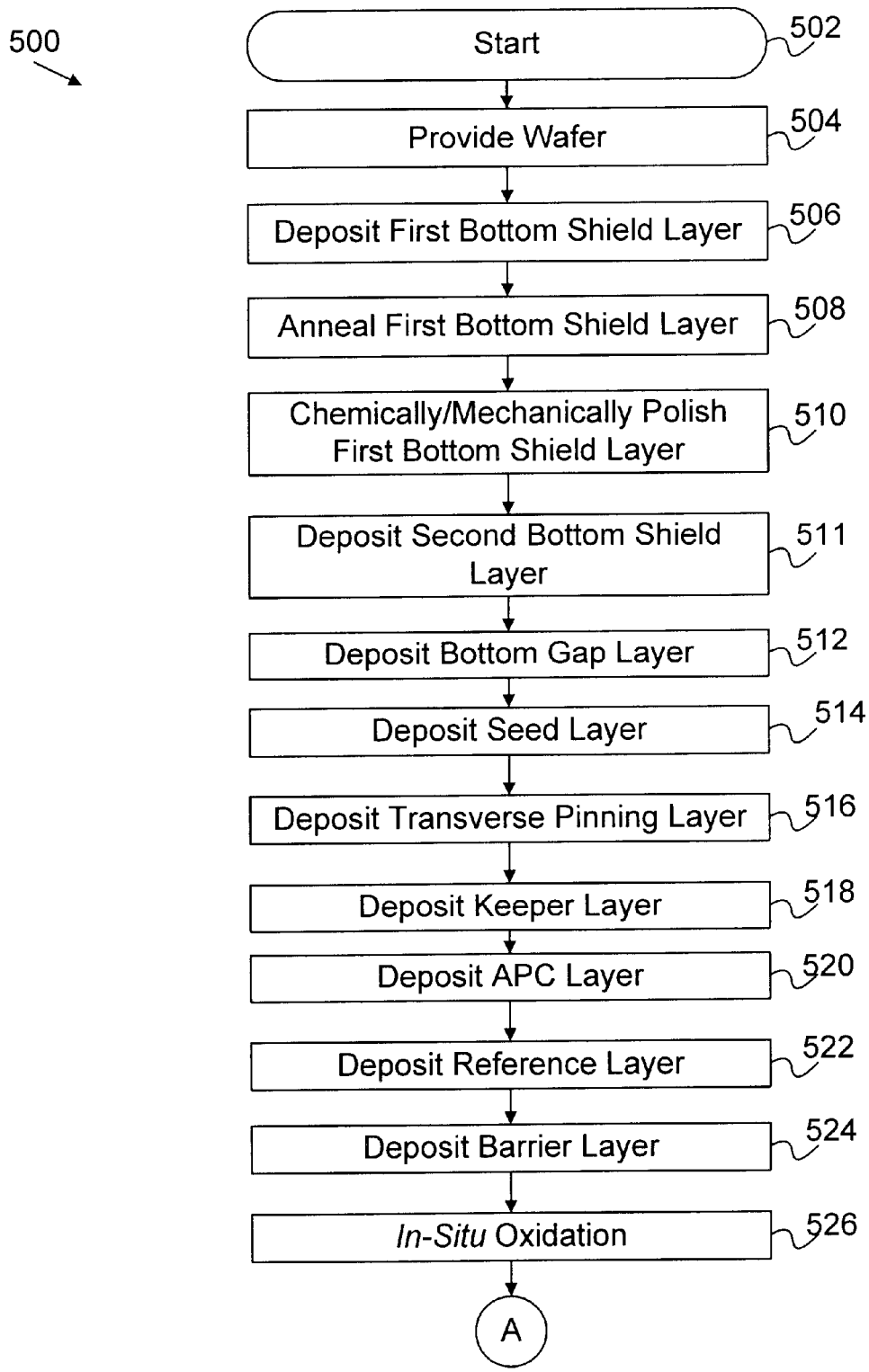
FIGS. 5A,B are a schematic flow chart diagram illustrating a method for forming the CPP read head of the present invention.
Figure 5:
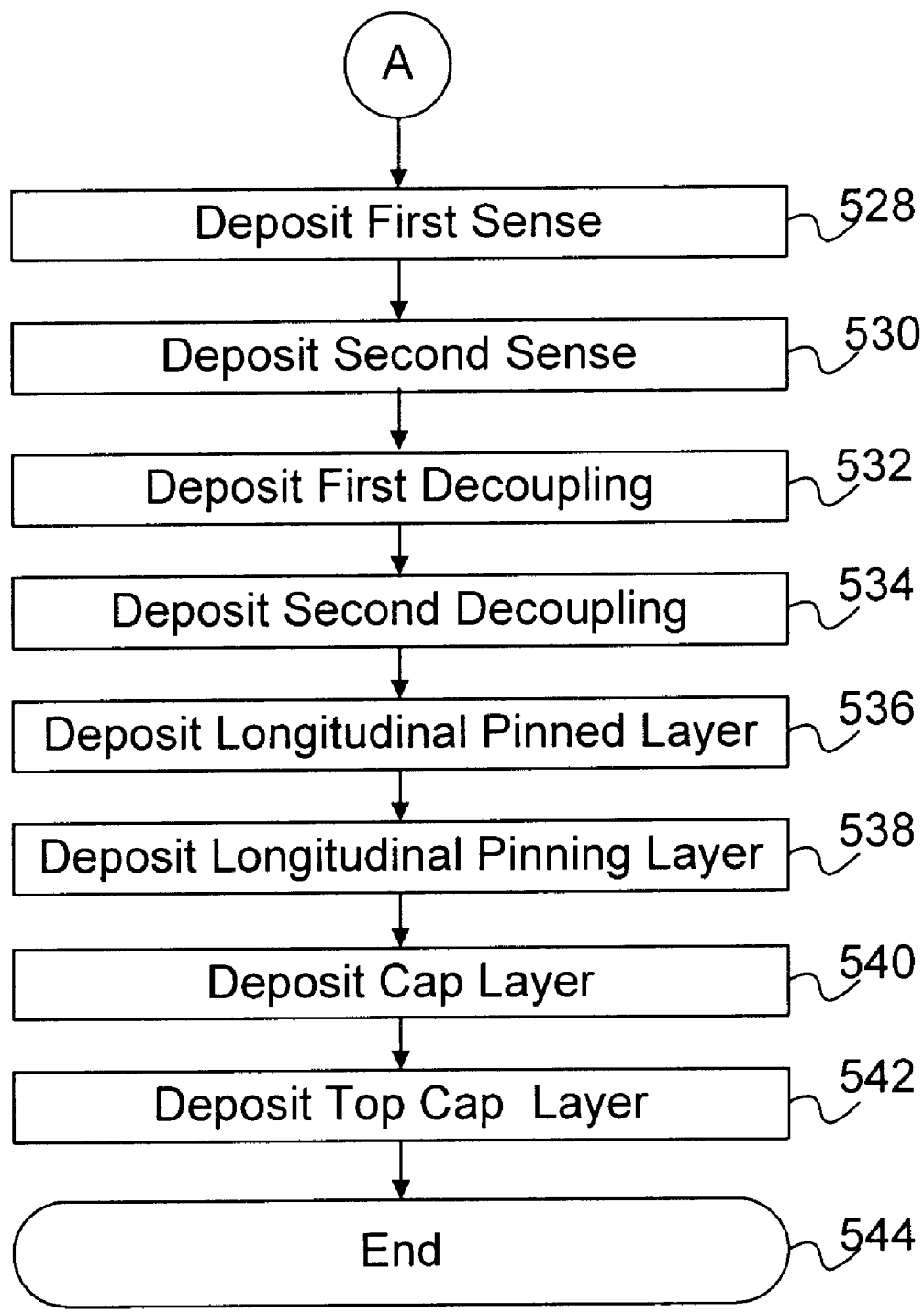

A method of fabricating the CPP read sensor with the amorphous magnetic bottom shield layer and the amorphous nonmagnetic bottom lead layer, as described above, is also part of the present invention. FIG. 5 illustrates one embodiment of the method 500 of forming the CPP read sensor with the amorphous magnetic bottom shield layer and the amorphous nonmagnetic bottom lead layer, in accordance with the present invention. The discussion of FIG. 5 will be given with reference to FIGS. 3 and 4, but is not to be considered limited thereto.

Under the method 500, the read gap thickness is designed to be as small as 800 Å in thickness for recording at ultrahigh densities ($\geq 30$ Gb/in$^2$). A first bottom shield layer 328 is deposited 506 on the wafer 330. The first bottom shield layer 328 is preferably formed of an Fe—Si—Al film of about 1.85 μm in thickness when deposited on the wafer 330. After the first bottom shield layer 328 is deposited 506, an anneal process is conducted 508, preferably for about six hours at about 475° C. The first bottom shield layer 328 is then chemically-mechanically polished 510 until the desired thickness of about 1.75 μm is obtained.

The wafer 330 with the first bottom shield layer 328 thereon is loaded to the integrated DC magnetron/ion beam sputtering system 400, and is then transferred through the transport module 406 to the multi-target ion beam sputtering module 404 of FIG. 4 for the depositions of an amorphous second bottom shield layer 326, an amorphous bottom lead layer 324, and a seed layer 322.

High-energy ion beam sputtering is preferably used to deposit these layers in order that the TMR sensor deposited thereon will exhibit a low $H_F$. Such a low $H_F$ is attained mainly due to the fact that the high-energy ion beam sputtering induces high atomic mobility, thereby providing a smooth surface for the deposition of the TMR sensor. Alternatively, DC magnetron sputtering at argon pressures of $\leq 1$ mTorr) can also be used to deposit these layers for the TMR sensor deposited thereon to exhibit a low $H_F$. At these argon pressures, the mean free path for the bombardments of sputtered atoms is so long that the energies of sputtered atoms arriving at the film surface are high enough for needed atomic mobility. DC magnetron sputtering at very low argon pressures thus simulates the preferred ion beam sputtering.

The wafer 330 is then transferred through a transport module 406 to a multi-target DC magnetron sputtering module 402 for the deposition of the transverse pinning layer 320, the keeper layer 318, the APC layer 316, the reference layer 314 and the barrier layer 312. Low-energy DC magnetron sputtering at argon pressures of $\geq 3$ mTorr is preferably used to deposit these layers to exhibit high transverse pinning fields and a high TMR coefficient. At these argon pressures, the mean free path for the bombardments of sputtered atoms is so short that the energies of sputtered atoms arriving the film surface are low. As a result, unwanted interface mixing is minimized and desirable TMR properties can be attained.

Following the deposition of the aforementioned layers, an in-situ oxidation process is conducted 526. In one embodiment, this in-situ oxidation process 526 is conducted in the oxidation module 408. In accordance with the in-situ oxidation process, the barrier layer 312 is in-situ oxidized in an oxygen gas with a pressure of about 2 Torr for about 4 minutes at room temperature.

After the in-situ oxidation process 526, the wafer 330 is then transferred through a transport module 406 to the multi-target DC magnetron sputtering module 402 for the deposition 528 of the first sense layer 310, the deposition 530 of the second sense layer 308, the deposition 532 of the first decoupling layer 306, the deposition 534 of the second decoupling layer 338, deposition 536 of the longitudinal pinned layer 340, the deposition 538 of the longitudinal pinning layer 342 and deposition 540 of the cap layer 344. A top cap layer is also preferably deposited 544, after which the process 500 ends 544. Low-energy DC magnetron sputtering at argon pressures of $\geq 3$ mTorr is preferably used to deposit these layers in order to exhibit a low ferromagnetic coupling field, a high TMR coefficient and a high longitudinal pinning fields. Since unwanted interface mixing is minimized, these desirable TMR properties are attainable under the present invention.

Figure 6:
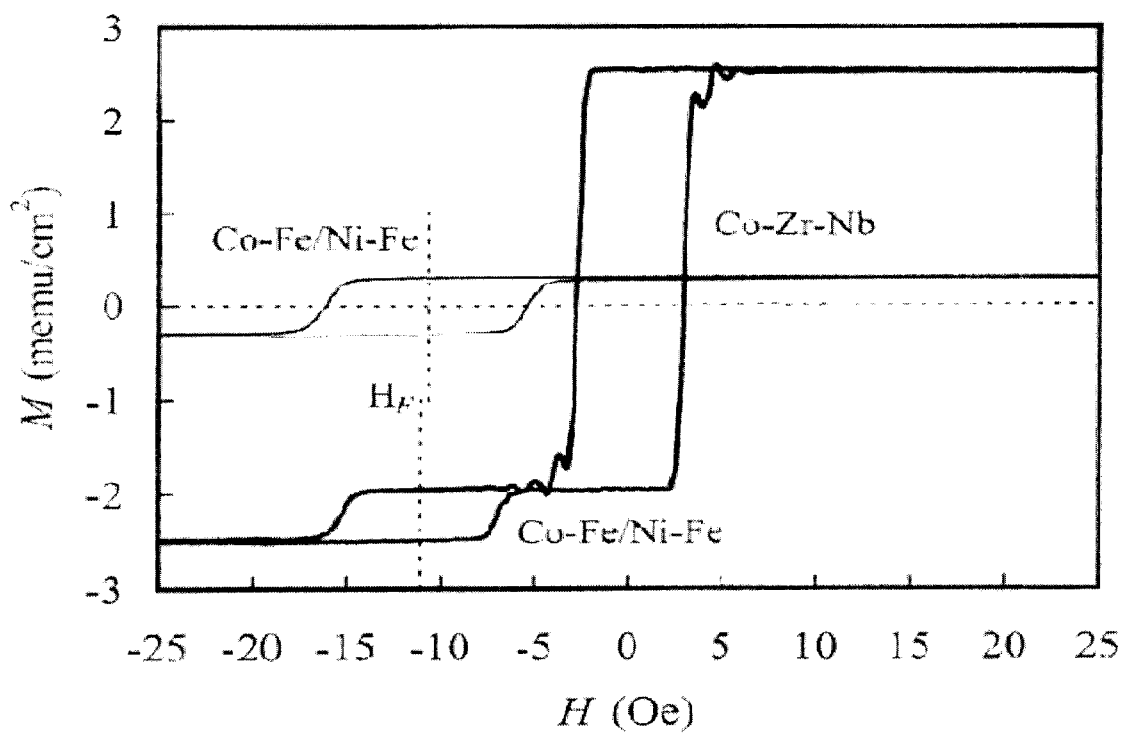
FIG. 6 is a chart showing ferromagnetic coupling fields attained from the CPP reads heads of the prior art and the present invention.

FIG. 6 shows ferromagnetic coupling fields attained from the CPP reads heads of the prior art and the present invention. The CPP read head comprises Ta(9.5)/Pt—Mn(22.5)/Co—Fe(2)/Ru(0.8)/Co—Fe(2.2)/Al—O(0.6)/Co—Fe(0.9)/Ni—Fe(3.5)/Ni—Cr—Fe(9) films. When such a read head is deposited on a glass substrate, it exhibits a ferromagnetic coupling field ($H_F$) of 10.9 Oe. When the read head is deposited on a chemically-mechanically-polished (CMP) 1.75 μm thick Fe—Al—Si film, its $H_F$ reaches as high as 51 Oe. The Al—O barrier layer appears to exhibit a rough topography so that desirable tunneling effects cannot be attained. However, when a 30 nm thick Ni—Fe film is sandwiched into the CMP Fe—Al—Si and the CIP read head, the $H_F$ becomes 16.4 Oe. Furthermore, when a 30 nm thick Co—Zr—Nb film is sandwiched into the CMP Fe—Al—Si and the CIP read head, the $H_F$ becomes as low as 9.2 Oe. These experimental results clearly indicate the crucial role of an amorphous second magnetic shield layer in attaining a low $H_F$.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A current-perpendicular-to-plane (CPP) read head, comprising:

a bottom shield layer formed of an amorphous magnetic material;

a bottom lead layer formed of an amorphous nonmagnetic material disposed to one side of the bottom shield layer;

a transverse pinning layer disposed to one side of the bottom lead layer;

a reference layer disposed to one side of the bottom lead layer; and a sensing layer disposed to one side of the reference layer.

2. The current-perpendicular-to-plane (CPP) read head of claim 1, further comprising:

a keeper layer disposed to one side of the transverse pinning layer;

an antiparallel-coupling (APC) layer formed of a nonmagnetic conducting film disposed to one side of the keeper layer;

a barrier layer formed of a nonmagnetic film disposed to one side of the reference layer;

a decoupling layer formed of a nonmagnetic film disposed to one side of the sensing layer;

a longitudinal pinned layer formed of a ferromagnetic film disposed to one side of the decoupling layer;

a longitudinal pinning layer formed of an antiferromagnetic (AFM) film disposed to one side of the longitudinal pinned layer; and a cap layer formed of a nonmagnetic film disposed to one side of the longitudinal pinning layer.

3. The current-perpendicular-to-plane (CPP) read head of claim 2, wherein the barrier layer is formed of a nonmagnetic, conducting film.

4. The current-perpendicular-to-plane (CPP) read head of claim 2, wherein the barrier layer is formed of a nonmagnetic, insulating film.

5. The current-perpendicular-to-plane (CPP) read head of claim 1, further comprising an antiparallel-coupling (APC) layer formed of a nonmagnetic conducting film disposed to one side of a keeper layer.

6. The current-perpendicular-to-plane (CPP) read head of claim 1, further comprising a top shield layer, and wherein the layers of claim 1 are disposed between the bottom shield layer and the top shield layer.

7. The current-perpendicular-to-plane (CPP) read head of claim 1, wherein the bottom shield layer is formed of an amorphous magnetic Fe-based film.

8. The current-perpendicular-to-plane (CPP) read head of claim 1, wherein the bottom shield layer is formed of a Co-based material.

9. The current-perpendicular-to-plane (CPP) read head of claim 1 wherein the bottom shield layer comprises a Fe-based alloy.

10. The current-perpendicular-to-plane (CPP) read head of claim 1, wherein the bottom shield layer is formed of an Fe—Si—Al film and further comprising a second bottom shield layer formed of one of a magnetic Fe-based film and a Co-based film.

11. The current-perpendicular-to-plane (CPP) read head of claim 10, wherein the second bottom shield layer has a thickness in a range of between about 50 Å and about 1000 Å.

12. The current-perpendicular-to-plane (CPP) read head of claim 1, wherein the bottom lead layer comprises a Tungsten-based alloy.

13. The current-perpendicular-to-plane (CPP) read head of claim 12, wherein the bottom lead layer comprises an amorphous nonmagnetic tungsten-based alloy film.

14. The current-perpendicular-to-plane (CPP) read head of claim 1, wherein the bottom lead layer has a thickness in a range of between about 50 Å and about 500 Å.

15. A method for forming a current-perpendicular-to-plane (CPP) read head, the method comprising:
    forming a bottom shield layer by depositing an amorphous magnetic film;
    forming a bottom lead layer by depositing an amorphous nonmagnetic film;
    forming a transverse pinning layer;
    forming a reference layer; and
    forming a sensing layer by depositing a ferromagnetic material.

16. The method of claim 15, further comprising:
    forming a keeper layer;
    forming an APC layer formed of a nonmagnetic conducting film;
    forming a barrier layer formed of a nonmagnetic film;
    forming decoupling layers formed of nonmagnetic films;
    forming a longitudinal pinned layer formed of a ferromagnetic film;
    forming a longitudinal pinning layer formed of an AFM film; and
    forming a cap layer formed of a nonmagnetic film.

17. The method of claim 16, wherein the bottom shield layer is formed closest to an underlying wafer, and further comprising forming an adjacent second bottom shield layer closest to the transverse pinning layer.

18. The method of claim 17, wherein forming the second bottom shield layer comprises forming the second bottom shield layer from a one of a Fe-based and a Co-based film.

19. The method of claim 17, wherein forming the second bottom shield layer comprises forming the second bottom shield layer with a thickness in a range of between about 50 Å and about 1000 Å.

20. The method of claim 15, wherein forming the bottom lead layer comprises forming the bottom lead layer from an amorphous nonmagnetic tungsten-based alloy film.

21. The method of claim 15, wherein forming the bottom lead layer comprises forming the bottom lead layer with a thickness in a range of between about 50 Å and about 500 Å.

22. A disk drive system, comprising:
    a current-perpendicular-to-plane (CPP) read head, the CPP read head comprising:
        a bottom shield layer formed of an amorphous magnetic film;
        a lower lead layer formed of an amorphous nonmagnetic film disposed to one side of the bottom shield layer;
        a transverse pinning layer formed of an AFM film disposed to one side of the lower lead layer;
        a keeper layer formed of a first ferromagnetic film disposed to one side of the pinning layer;
        an APC layer formed of a nonmagnetic conducting film formed to one side of the keeper layer;
        a reference layer formed of a ferromagnetic film disposed to one side of the APC layer;
        a barrier layer formed of a nonmagnetic film disposed to one side of the reference layer;
        a plurality of sensing layers formed of ferromagnetic films disposed to one side of the barrier layer;
        a decoupling layer formed of a nonmagnetic film disposed to one side of the plurality of sensing layers;
        a longitudinal pinned layer formed of a ferromagnetic film disposed to one side of the decoupling layer;
        a longitudinal pinning layer formed of an AFM film disposed to one side of the longitudinal pinned layer; and
        a cap layer formed of a nonmagnetic film disposed to one side of the longitudinal pinning layer;
    an actuator for moving the CPP read head across the magnetic recording disk so the CPP read head may access different regions of magnetically recorded data on a magnetic recording disk; and
    a detector coupled to the CPP read head for detecting changes in resistance of the CPP read head caused by rotation of the magnetization of the sensing layer relative to the fixed magnetization of the keeper layer and the reference layer in response to the magnetic fields from the magnetically recorded data.

* * * * *

UNITED STATES PATENT AND TRADEMARK OFFICE
CERTIFICATE OF CORRECTION

PATENT NO. : 6,735,058 B2
DATED : May 11, 2004
INVENTOR(S) : Lin et al.

Figure 1:
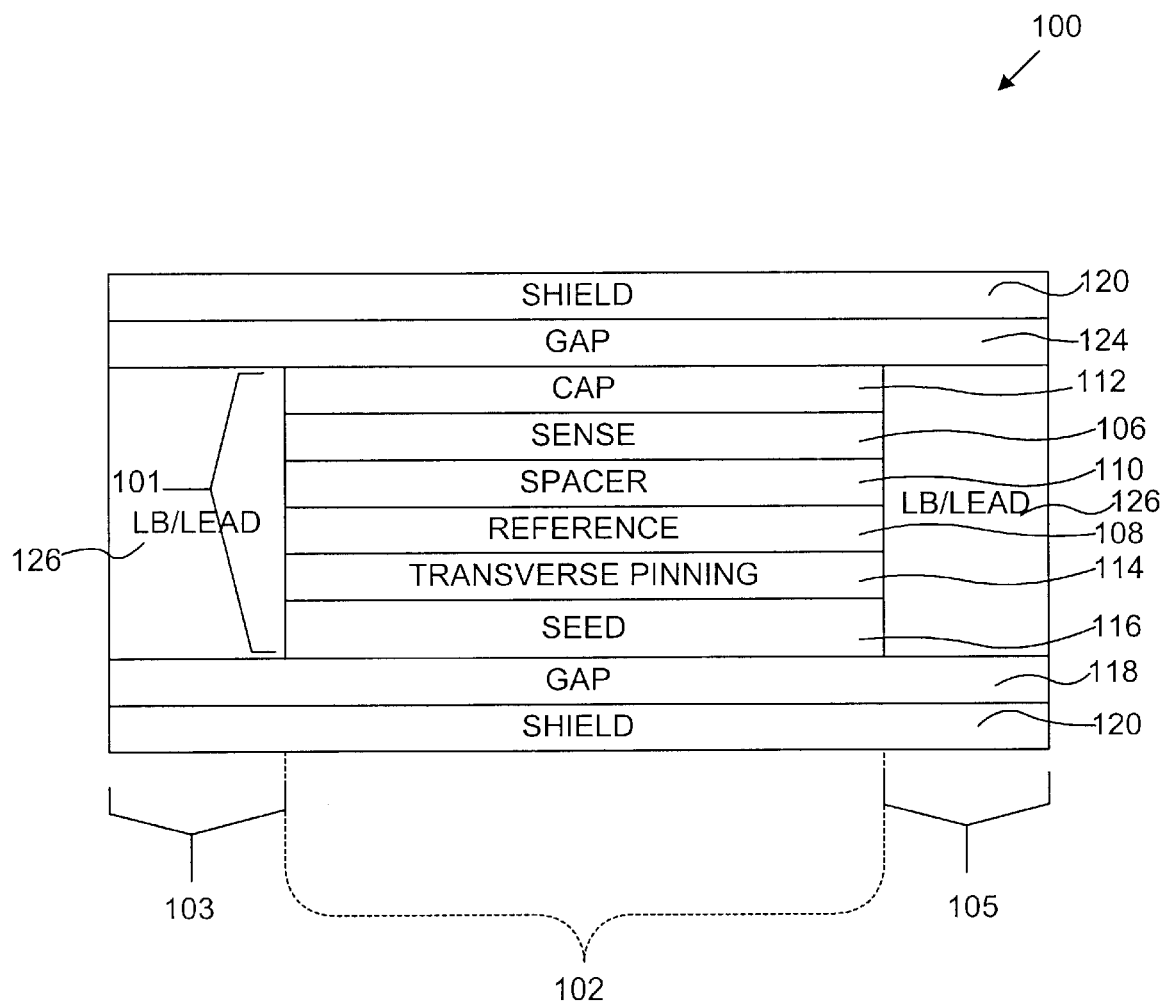
FIG. 1 is a cross-sectional view illustrating the structure of a CIP read head of the prior art.
Figure 2:
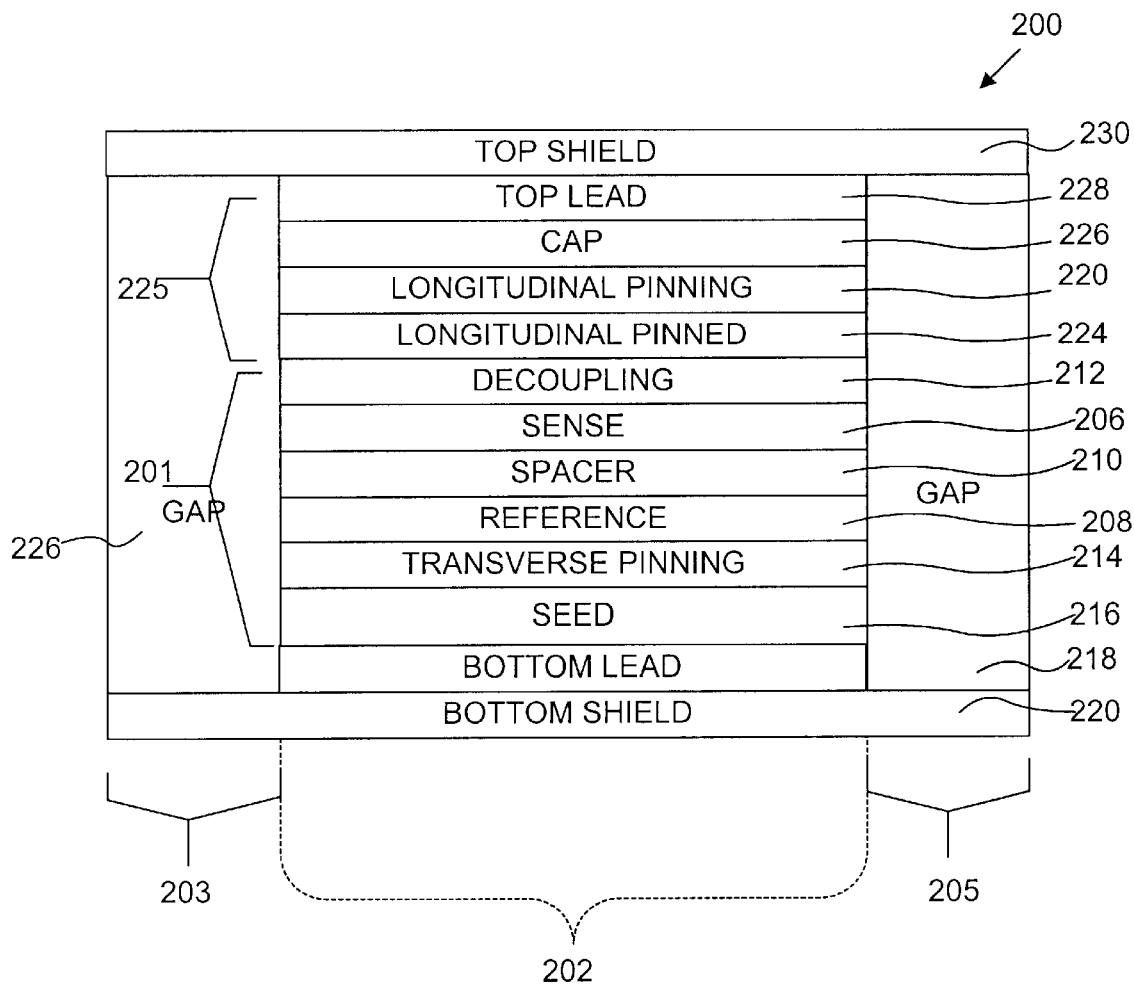
FIG. 2 is a cross-sectional view illustrating the structure of a CPP read head of the prior art.

It is certified that error appears in the above-identified patent and that said Letters Patent is hereby corrected as shown below:

Drawings,
Figure 2, Longitudinal Pinning, "220" should read -- 221 --
Figure 3, Layers Collectively Labeled "330" should read -- 331 --

Column 2,
Line 60, "GMR coefficients leads" should read -- GMR coefficient leads --

Column 3,
Line 24, "TMR coefficients leads" should read -- TMR coefficient leads --
Line 46, "pinning layer 220" should read -- pinning layer 221 --

Column 4,
Line 43, "transverses pinning" should read -- transverse pinning --

Column 5,
Line 67, "CPP Read head" should read -- CPP read head --

Column 6,
Line 1, "Atone extreme" should read -- At one extreme --
Line 35, "TMR sensor 330" should read -- TMR sensor 331 --
Line 49, "has preferred" should read -- has a preferred --

Column 7,
Line 22, "TMR sensor 330" should read -- TMR sensor 331 --

Column 9,
Line 26, "inTorr) can" should read -- mTorr can --
Line 63, "deposited 544" should read -- deposited 542 --

UNITED STATES PATENT AND TRADEMARK OFFICE
CERTIFICATE OF CORRECTION

PATENT NO. : 6,735,058 B2
DATED : May 11, 2004
INVENTOR(S) : Lin et al.

It is certified that error appears in the above-identified patent and that said Letters Patent is hereby corrected as shown below:

Column 10,
Line 5, "CPP reads heads" should read -- CPP read heads --

Signed and Sealed this

Sixteenth Day of November, 2004

JON W. DUDAS
*Director of the United States Patent and Trademark Office*